(12) United States Patent
Balmelli et al.

(10) Patent No.: US 12,192,903 B2
(45) Date of Patent: *Jan. 7, 2025

(54) LOW POWER WAKE ON RADIO

(71) Applicant: Silicon Laboratories Inc., Austin, TX (US)

(72) Inventors: Pio Balmelli, Switzerland (CH); Praveen Vangala, Austin, TX (US); John M. Khoury, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/329,496

(22) Filed: May 25, 2021

(65) Prior Publication Data

US 2021/0282088 A1 Sep. 9, 2021

Related U.S. Application Data

(62) Division of application No. 16/226,423, filed on Dec. 19, 2018, now Pat. No. 11,057,834.

(51) Int. Cl.
*H04W 52/02* (2009.01)
(52) U.S. Cl.
CPC ..... *H04W 52/0235* (2013.01); *H04W 52/028* (2013.01); *H04W 52/0293* (2013.01)
(58) Field of Classification Search
CPC ....... H04L 27/06; H04L 69/22; H04L 1/0061; H04L 12/12; H04L 12/40039; Y02D 70/00; Y02D 70/166; Y02D 70/1242; Y02D 70/1262; Y02D 70/142; Y02D 30/70; Y02D 70/1264; Y02D 70/144; Y02D 10/00; H04W 52/0229; G06F 1/3296; G06F 1/26; G06F 1/3209; G06F 1/325; G06F 1/3287; G06F 1/3278; H03K 5/2472; H03K 19/018521
See application file for complete search history.

(56) References Cited

U.S. PATENT DOCUMENTS

| | | | |
|---|---|---|---|
| 6,836,468 B1 | 12/2004 | O'Toole et al. | |
| 7,155,263 B1 | 12/2006 | Bergamo | |
| 9,413,403 B2 | 8/2016 | Wentzloff et al. | |
| 10,256,802 B1 * | 4/2019 | Vaz | G01R 1/36 |
| 10,462,744 B2 | 10/2019 | Huang et al. | |
| 10,606,333 B2 | 3/2020 | Sasson et al. | |
| 2003/0179028 A1 | 9/2003 | Kizer et al. | |
| 2004/0041605 A1 | 3/2004 | Kizer | |
| 2005/0121526 A1 | 6/2005 | Stewart et al. | |
| 2006/0255131 A1 | 11/2006 | Stewart | |

(Continued)

FOREIGN PATENT DOCUMENTS

CN 108075869 A 5/2018

*Primary Examiner* — Yee F Lam
(74) *Attorney, Agent, or Firm* — Zagorin Cave LLP

(57) ABSTRACT

A low power wake on radio circuit detects if an RF signal is present on an input to the wake on radio circuit. An RF sense circuit supplies an RF sense signal indicating whether the RF signal is present on the input. The RF sense signal is used to incrementally turn on digital decode logic to determine if a radio transmission that is unique to the wake on radio circuit has been received. If the unique radio transmission have been received, the wake on radio circuit supplies a wakeup signal to the rest of the system.

20 Claims, 11 Drawing Sheets

(56) References Cited

U.S. PATENT DOCUMENTS

| | | |
|---|---|---|
| 2007/0168681 A1 | 7/2007 | Leung |
| 2009/0275302 A1 | 11/2009 | Huston et al. |
| 2011/0068765 A1* | 3/2011 | Segoria ............... H04B 1/1607 |
| | | 323/313 |
| 2013/0099570 A1 | 4/2013 | Manohar |
| 2015/0156032 A1 | 6/2015 | de Haas |
| 2016/0154039 A1 | 6/2016 | Shen |
| 2016/0278013 A1 | 9/2016 | Shellhammer et al. |
| 2017/0094600 A1* | 3/2017 | Min ....................... H04W 8/24 |
| 2017/0242709 A1 | 8/2017 | Bodner et al. |
| 2018/0007629 A1* | 1/2018 | Dorrance .......... H04W 52/0229 |
| 2018/0192373 A1* | 7/2018 | Fang ..................... H04L 27/06 |
| 2018/0263058 A1* | 9/2018 | Yang ................ H04W 74/0825 |
| 2019/0082385 A1* | 3/2019 | Shellhammer .......... H04L 47/25 |
| 2019/0179398 A1* | 6/2019 | Arora ...................... G06F 1/26 |
| 2019/0281548 A1* | 9/2019 | Kristem ............ H04W 52/0216 |
| 2020/0076449 A1* | 3/2020 | Nezamfar ............... H03M 3/02 |

\* cited by examiner

LOW POWER WAKE ON RADIO

CROSS-REFERENCE TO RELATED APPLICATIONS

This application is a divisional of U.S. patent application Ser. No. 16/226,423, filed Dec. 19, 2018, entitled "Low Power Wake on Radio," naming Pio Balmelli, Praveen Vangala, and John M. Khoury as inventors, which application is incorporated herein by reference in its entirety.

BACKGROUND

Field of the Invention

The disclosure herein relates to wake on radio and particular to low power approaches to wake on radio systems.

Description of the Related Art

Wake on radio has been used in the past to wake up an integrated circuit based on a radio transmission. Some wake on radio approaches look for a radio frequency (RF) signal and responsive to detecting the RF signal wakes up the remainder of the integrated circuit. That can lead to erroneous waking events due to noise or due to transmissions directed to other devices. More efficient wake on radio approaches are desirable to ensure that battery consumption remains low while waiting to detect an RF signal.

SUMMARY OF EMBODIMENTS OF THE INVENTION

Embodiments described herein provide a power effective solution for waking up an integrated circuit using an RF signal and for accurately detecting the RF signal.

Accordingly, in a first embodiment a method includes detecting if a radio frequency (RF) signal is present on an input to a wake on radio circuit. The method further includes supplying detection indications, each of the detection indications having a first value indicating that the RF signal was detected on the input and having a second value indicating that the RF signal was not detected on the input. Based on the detection indications decode logic is incrementally enabled to decode a radio transmission selective to the wake on radio circuit.

In another embodiment an apparatus includes an analog portion of a wake on radio circuit. The analog portion includes an input transistor having a biased gate coupled to an input to the wake on radio circuit. The input transistor detects if there is a radio frequency (RF) signal present on the input. A comparator has a first comparator input coupled to a drain of the input transistor in an operational mode and has a second comparator input coupled to a reference voltage in the operational mode. The comparator supplies a comparison indication indicating whether the RF signal was detected on the input. A digital control portion of the wake on radio circuit is coupled to the comparison indication. The digital portion of the wake on radio circuit is configured to periodically cause the analog portion to enter a calibration mode that uses the comparator for calibration.

In still another embodiment a wake on radio circuit includes an input transistor having a gate coupled to an input to the wake on radio circuit to detect if there is a radio frequency (RF) signal present on the input. The input transistor has the gate biased so that a drain of the input transistor toggles from high to low responsive to an amplitude of the RF input signal reaching a threshold level. A comparator has a first comparator input coupled to a drain of the input transistor in an operational mode and has a second comparator input coupled to a reference voltage in the operational mode. The comparator supplies RF sense data indicating whether the RF signal was detected on the input. The gate of the first transistor is also coupled to the reference voltage to bias the gate.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
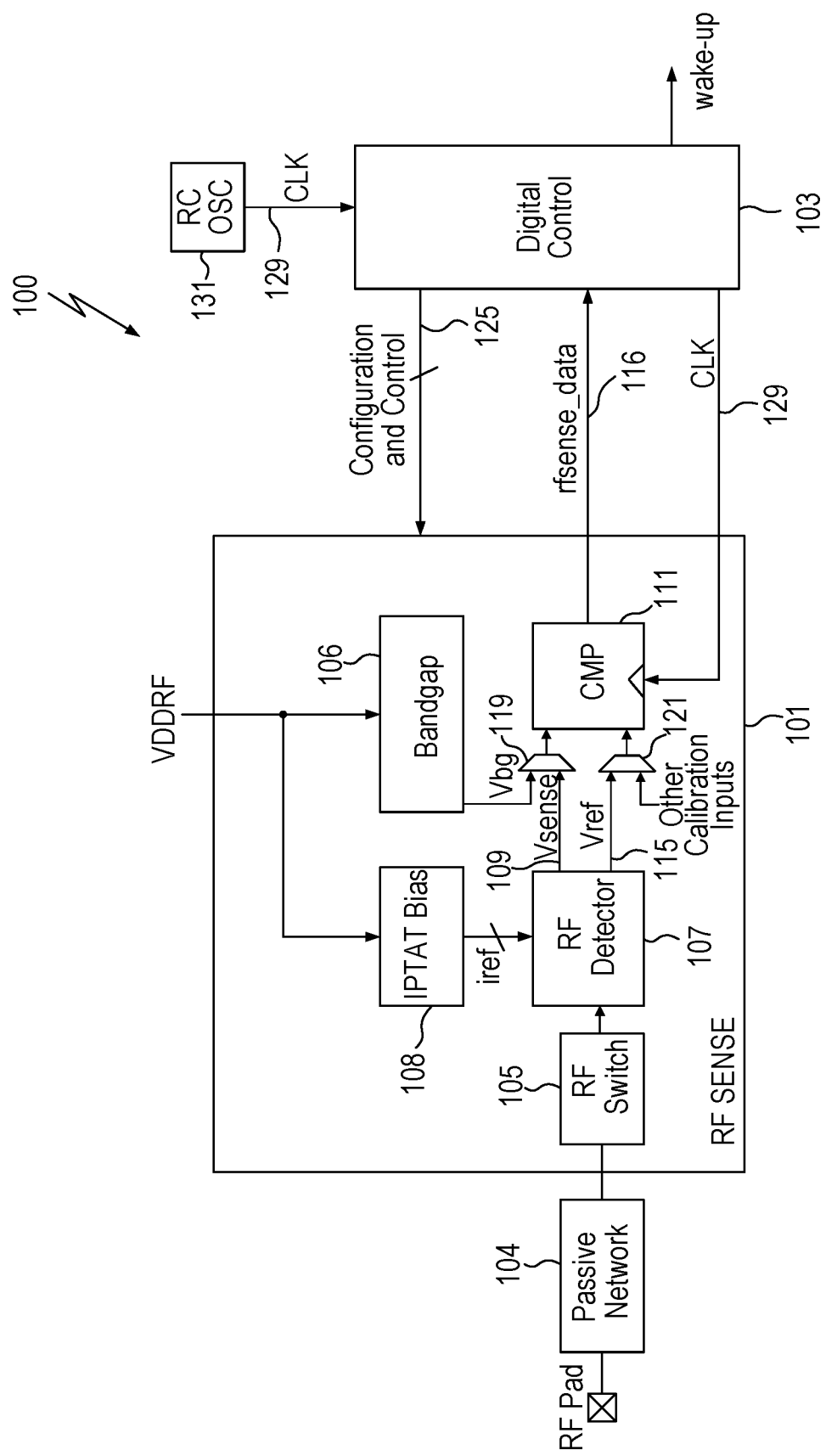
FIG. 1 illustrates a high level block diagram of a wake on radio system according to an embodiment.

FIG. 1 illustrates a high level block diagram of a wake on radio system 100 according to an embodiment. The system 100 includes an analog RF sense circuit block 101 and digital control logic 103. The wake on radio system 100 is a subsystem of an integrated circuit (or larger system). The integrated circuit (or larger system) remains in an off state or very low power state until a radio signal detected by the wake on radio system causes the larger system to wake up.

The analog RF sense circuit block 101 receives an RF signal supplied through a passive network 104 and RF switch 105. The RF sense circuit block 101 includes a bandgap reference subblock 106, a PTAT based bias current generator 108, where PTAT is proportional to absolute temperature. The RF sense circuit block 101 further includes an RF detector 107. The RF detector 107 detects the presence or absence of an RF signal on the RF input and supplies an RF sense signal 109 to comparator 111 indicating whether an RF signal has been detected. The synchronous comparator 111 compares the voltage on the sense signal 109 to a reference voltage Vref 115 and provides RF sense data 116 indicating the outcome of the comparison to the digital control logic 103. The digital control logic 103 receives the sense data 116 and determines whether an RF transmission has been received that is intended for the wake on radio system 100. For example, in an embodiment, a transmission includes a preamble and an identification sequence that selects a particular wake on radio circuit. As explained further herein, in embodiments the digital control logic 103 prevents false triggers in order to avoid draining the battery, thereby providing a more power efficient wake on radio system.

The RF sense circuit block 101 receives a supply voltage VDDRF from a power source such as a battery. The bandgap circuit 106 supplies a bandgap voltage (Vbg) that is utilized as a reference voltage during calibration operations as explained further herein. Multiplexer 119 selects the bandgap voltage during calibration. Multiplexer 121 selects other inputs to the comparator during calibration.

The digital control logic 103 also supplies various configuration and control signals 125 to the RF sense circuit 101. The configuration and control signals 125 select between operational and various calibration modes by providing switch and multiplexer control signals as explained further herein. The configuration and control signals supply trim signals to set and/or adjust programmable resistors and other configurable components, e.g., current sources. The configuration and control signals provide a control signal to enable/disable the bandgap voltage source during calibration/operation. Finally, the wake on radio system 100 utilizes an RC oscillator 131 to lower power consumption and cost associated with generating the clock signal 129, as compared to, e.g., a crystal oscillator. The error that can be associated with an RC oscillator clock signal, e.g., approximately ±20%, is well tolerated in embodiments described herein.

Figure 2:
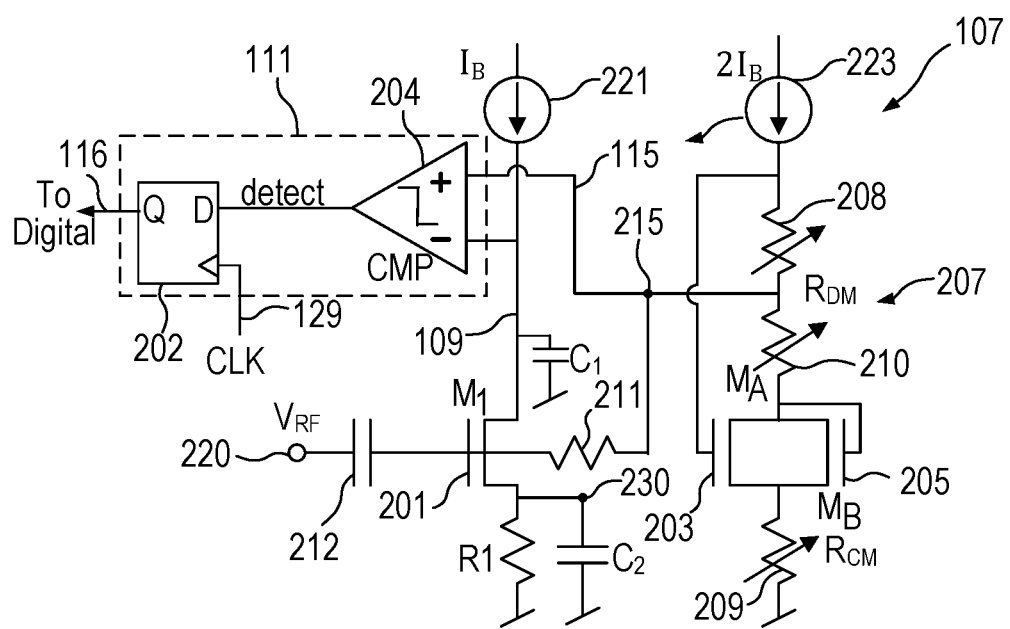
FIG. 2 illustrates additional details of the RF detector circuit and the comparator.

Referring to FIG. 2, the RF detector circuit 107 is a wide-band, high precision, low power RF energy detector that operates in a self-contained manner without support of any additional infrastructure circuits such as a voltage reference or a current reference supplied from other parts of the integrated circuit, thereby allowing the other parts of the integrated circuit to remain in a powered off state. The RF detector circuit 107 is the core of the RF sense circuit 101. The RF detector circuit 107 includes transistor $M_1$ 201 operating in an open-drain configuration that is biased so that its output transitions from high to low when the amplitude of the RF input signal reaches the desired threshold level. The comparator 111 is a synchronous comparator and in an embodiment flip-flop 202 samples the output of the comparator 204 using the clock signal 129 and supplies digital sense data 116 to the digital control logic 103 (see FIG. 1) that indicates the result of the compare operation. In an embodiment, a "1" from the flip-flop 202 indicates an RF signal was detected and a "0" indicates no RF signal was detected.

To accurately determine the RF threshold, the detector 107 uses two replica transistors $M_A$ 203 and $M_B$ 205 biased in such a way as to mimic the average gate voltage of the input transistor when the RF signal with the desired amplitude is applied. The mismatch of these transistors is accurately calibrated through two digital to analog converters (DACs). The first DAC ($R_{DM}$) 207, is implemented as 2 programmable resistors 208 and 210 across the gates of the replica transistors 203 and 205, and compensates for the threshold voltage $V_T$ mismatch between the replica transistors. The first DAC ($R_{DM}$) 207 is referred to herein as the differential mode (DM) DAC. The second DAC ($R_{CM}$) 209, is implemented as a programmable source degeneration resistor, and compensates for the $V_T$ mismatch between the main sensor transistor 201 and the replica transistors 203 and 205 combined. The second DAC ($R_{CM}$) 209 is referred to herein as the common mode (CM) DAC. The DM DAC ($R_{DM}$ 207) also sets the threshold of the RF signal as explained further herein. As shown in FIG. 2, the comparator 204 receives the reference voltage from the middle node 215 of the DM DAC, which is the node between resistors 208 and 210. The voltage on node 215 is also supplied to bias the gate of transistor $M_1$ 201 through a resistor 211. The RF detector 107 also includes the capacitor C1, which functions as an RF filter. Capacitor C2 makes the transconductance of the main sense transistor $M_1$ 201 match that of the two replica transistors 203 and 205. Note that transistor $M_1$ 201 receives an AC signal and the replica transistors operate on DC signals. In operational mode capacitor C2 provides virtual ground at node 230.

The PTAT current generator 108 (see FIG. 1), which generates a current that is proportional to the temperature, supplies the biasing current $I_B$ 221 for the transistor 201 and the bias current $2I_B$ 223 for the replica transistors 203 and 205. Using the PTAT current generator enables the implementation of a simple, low-power block. In order to achieve the constant voltage required across the DAC resistors, and hence to maintain an accurate RF threshold and a stable mismatch compensation, the PTAT current is periodically calibrated. In addition to PTAT calibration, additional calibrations are performed with the RF signal decoupled, by tuning resistors in the DM DAC and CM DAC. The mismatch between the replica transistors is calibrated by tuning the DM DAC. The common mode mismatch with the primary sense transistor $M_1$ 201 is calibrated by tuning the CM DAC.

In operation the gate of transistor $M_1$ 201 is connected to the RF input 220 through an AC coupling capacitor 212. The DAC $R_{CM}$ 209 is set according to the CM calibration result as described further herein. The DAC $R_{DM}$ 207 is set according to the DM calibration result described further herein and in addition DAC $R_{DM}$ 207 also stores the desired rms threshold.

$$R_{DM} = \frac{V_{OSDM} + \frac{A}{\sqrt{2}}}{2I_B},$$

where A is amplitude of the RF signal 21B threshold and $V_{OSDM}$ is the differential mode offset voltage across $R_{DM}$ 207. When the output of comparator 204 goes high it means that $V_{RF}$ amplitude has reached the programmed level.

Figure 3:
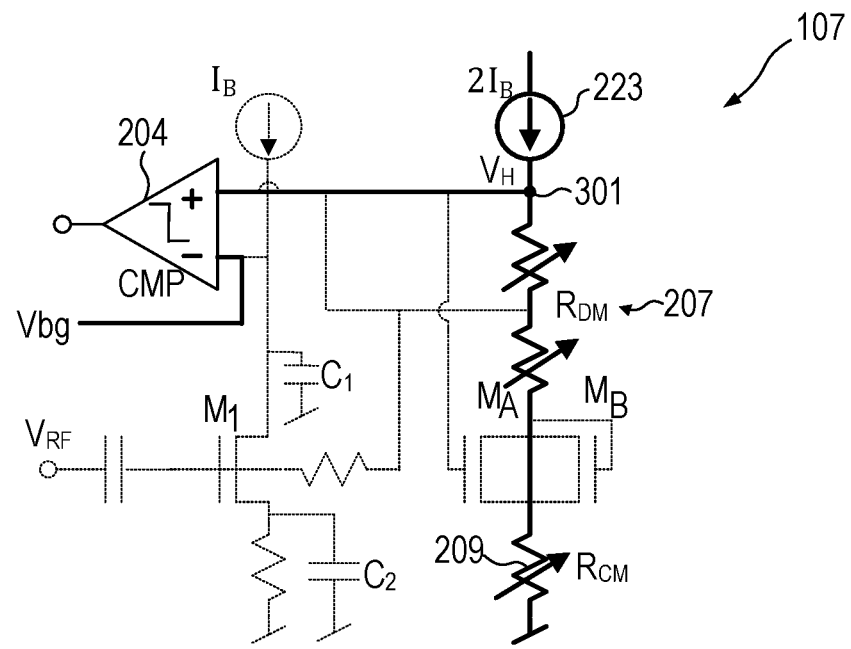
FIG. 3 illustrates the circuit configuration for calibration of the PTAT current.

Referring to FIG. 3, the calibration of the PTAT current is implemented by comparing the voltage drop across the DAC resistors against a fixed voltage. One input of comparator 204 is connected to the top node of $R_{DM}$ at 301. The PTAT current $2I_B$ 223 is forced into the stacked DAC resistors $R_{DM}$ 207 and $R_{CM}$ 209 and the resulting voltage is compared against the highly accurate band-gap reference (Vbg) in comparator 204. During calibration the resistance of DAC $R_{DM}$ 207 and DAC $R_{CM}$ 209 are maximized. In one embodiment the DAC $R_{CM}$ 209 is initially set to midscale, instead of full-scale, and subsequently adjusted to compensate for the error caused by the comparator (CMP) offset $V_{OS}$. The digital IPTAT calibration algorithm controlled by a finite state machine in the digital control logic 103 (FIG. 1), modifies the external IPTAT current until $V_H$=Vbg and then stores the PTAT current settings.

In FIG. 3, those portions of the circuit shown as dotted lines are switched out of the circuit for the calibration operation. In order to do that, the digital control logic 103 supplies configuration bits to set appropriate switches (e.g., NMOS transistors not shown in FIG. 3) to configure the circuit as shown in FIG. 3. Because the bandgap reference consumes much more power than the rest of the circuit, the bandgap voltage reference circuit 106 (FIG. 1) is normally off and the bandgap voltage reference circuit 106 is only woken up when required for the calibration operation and specifically to calibrate the PTAT current. Since by nature the temperature varies slowly, the bandgap reference 106 needs to be woken up by the digital control logic 103 only once every few seconds or other appropriate time depending on the circuit application (e.g., accuracy requirements) and environmental factors. As a result, the duty-cycle is very small (~0.001) and the average current consumption of the bandgap voltage reference circuit 106 is comparable to the other blocks of the RF sense circuit block 101.

The temperature variation has also an effect on the calibrated $V_T$ and especially on the common-mode calibration, therefore the common mode calibration for the CM DAC is also run periodically. Those two calibrations are implemented in the digital control logic 103 and do not require other portions of the integrated circuit, e.g., a microcontroller, to be awake. As a result, the power overhead is low. Calibrations for the DM DAC can be run once, e.g., at power up, or more often according to system requirements.

The RF detector circuit 107 has intrinsically high gain and acts as a comparator as well, so that the comparator 204 has very low offset requirements and can be fast. The RF detection uses a detector circuit 107 with only two current branches ($I_B$ and $2 I_B$) and a comparator 204 allowing for very low power operation since the bias current are nA bias currents. In addition, very fine trim granularity can be achieved with reasonably large resistors thanks to the use of nA bias currents.

Figure 4:
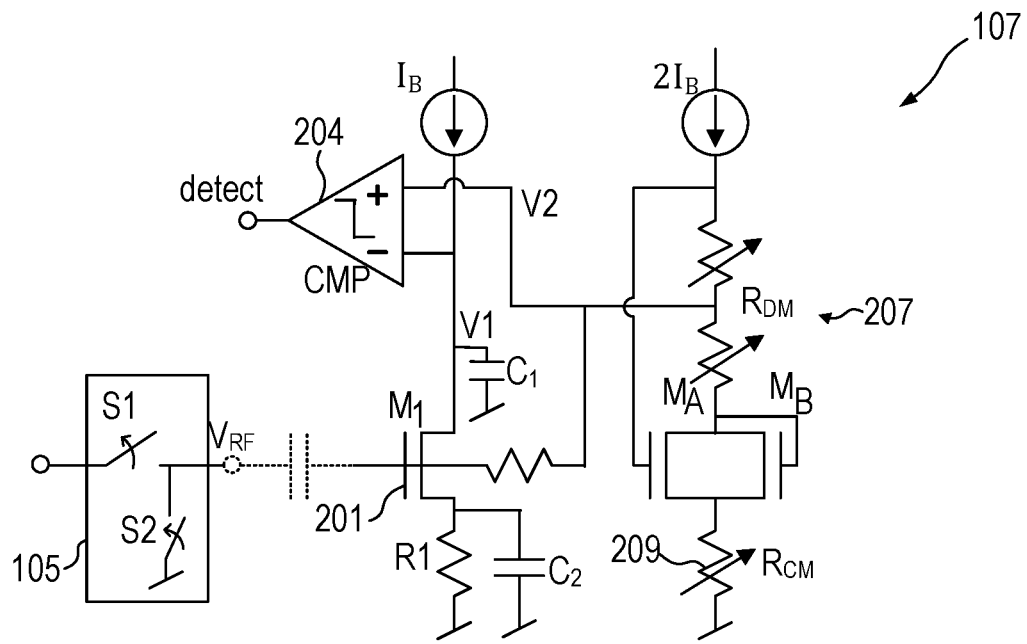
FIG. 4 illustrates the circuit configuration for calibration of the common mode of the replica transistors, which is implemented with a programmable resistor.

Multiple DM and CM calibrations are utilized. The number and type of calibrations depend on the requirements of specific embodiments. Those calibrations shown herein are by way of example and fewer or additional calibration operations can be run according to the needs of a particular embodiment. It is useful for the bias current to be calibrated before other calibration operations are run. Referring to FIG. 4, the digital control logic algorithm accomplishes one of the common mode calibrations by disconnecting the gate of $M_1$ 201 from the RF input using switch 105 (FIG. 1), setting CM DAC $R_{CM}$ 209 to midscale, and setting the differential mode DAC $R_{DM}$ 207 according to the DM calibration result but without amplitude threshold information in $R_{DM}$ during the calibration. The digital calibration algorithm modifies $R_{CM}$ 209 until the voltage V1 equals the voltage V2 and then stores the resistance setting. While not shown in all the figures for ease of illustration, in an embodiment the switch 105 (FIG. 1) used to disconnect the RF input from the gate of $M_1$ during calibration includes a switch S1 that opens during calibration and a switch S2 that closes during calibration to couple the AC coupling capacitor to ground through S2. Note that resistor R1 and $R_{CM}$ 209 have the same functionality. In embodiments illustrated herein, R1 is fixed and all the tuning is achieved by varying $R_{CM}$ 209. However, in another embodiment, R1 is a variable resistor and $R_{CM}$ 209 is fixed. In another embodiment both R1 and $R_{CM}$ 209 are variable and tuned during common mode calibration. In an embodiment $R_1$ is a copy of $R_{CM}$ 209 in which the digital control signal is set to full-scale by hardware.

Figure 5:
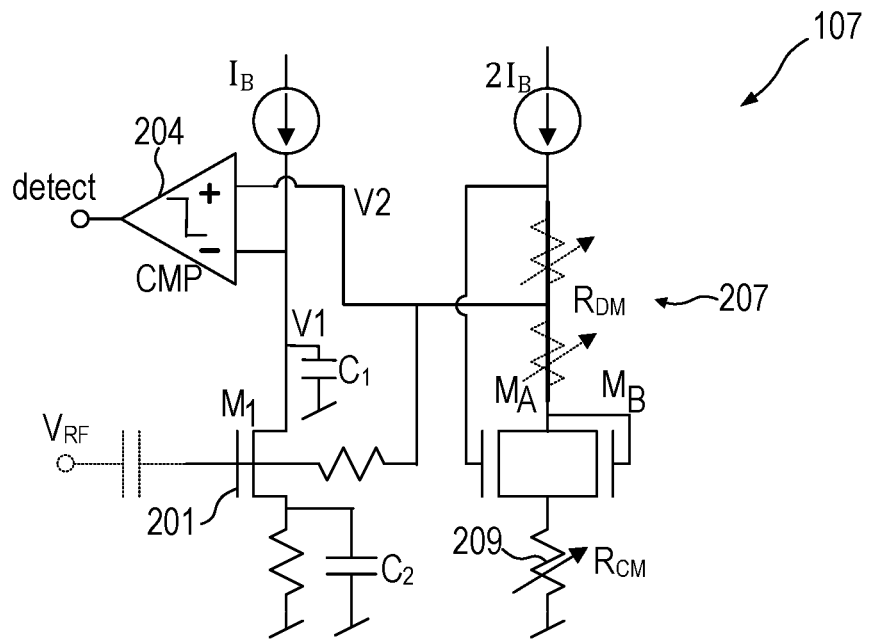
FIG. 5 illustrates the circuit configuration for another calibration of the common mode of the replica transistors.

FIG. 5 illustrates another common mode calibration with $R_{DM}$ 207 shorted so the bias current $2 I_B$ flows through the replica transistors $M_A$ 203 and $M_B$ 205 and $R_{CM}$ 209. To configure the RF detector 107 for this calibration mode, the digital control logic disconnects the gate of $M_1$ from the RF pin, and sets CM DAC $R_{CM}$ 209 to midscale. The digital control logic then modifies $R_{CM}$ 209 until V1 equals the voltage V2 and stores the resistance setting. This calibration is simpler but less accurate than the common mode calibration illustrated in FIG. 4.

Figure 6:
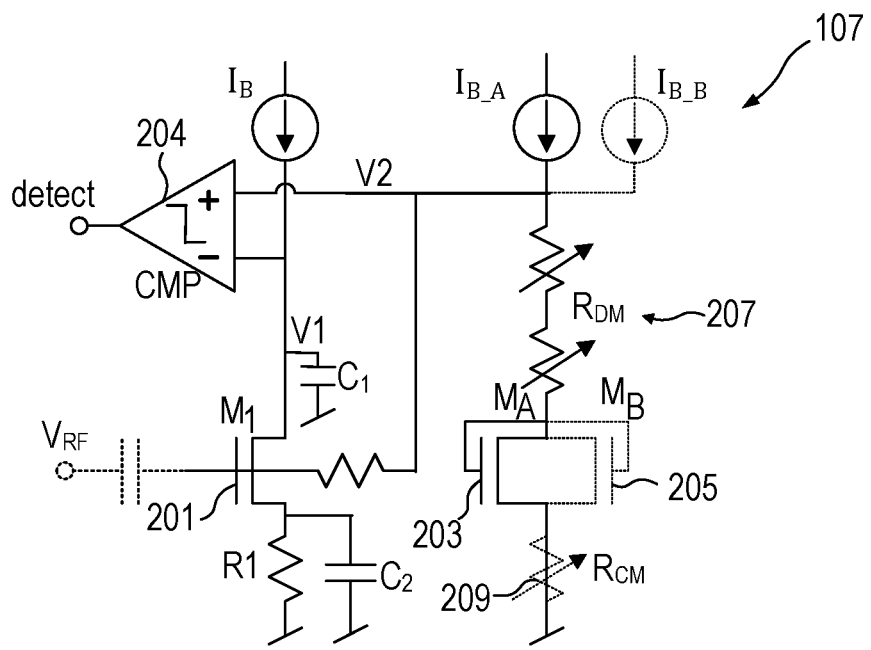
FIG. 6 illustrates the differential mode calibration of one of the replica transistors.

FIG. 6 illustrates the differential mode calibration of replica transistor $M_A$ 203 to compensate for differences between the replica transistors and achieve good matching. The digital control logic configures the RF detector 107 by disconnecting the gate of $M_1$ 201 gate from the RF pin and shorting $R_{CM}$ 209. The digital control logic controls switches, not shown in FIG. 6, to implement the desired hardware configuration for calibration. The bias current $2I_B$, which as shown is made of $I_{B\_A}+I_{B\_B}$ is halved by disabling $I_{B\_B}$. The other replica transistor $M_B$ 205 is disabled. Note that $R_{DM}$ is set to mid-scale so that it is equal to $R_1$. The digital control logic DM calibration algorithm modifies $R_{DM}$ until V1 equals the voltage V2 and then stores the resistor setting.

Figure 7A:
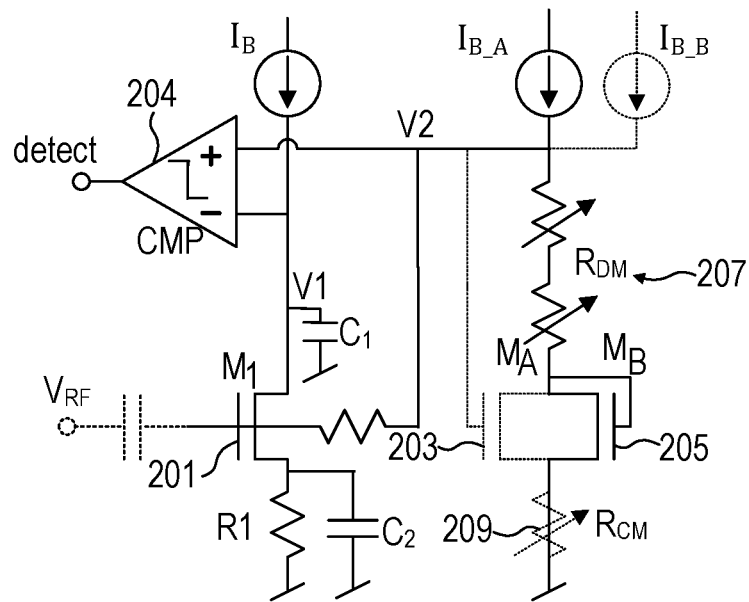
FIG. 7A illustrates the differential mode calibration of another of the replica transistors.
Figure 7B:
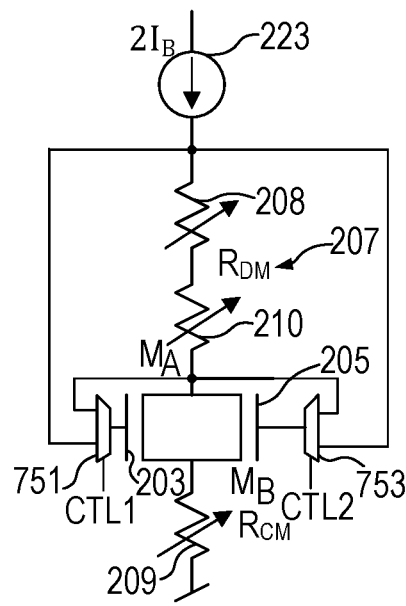
FIG. 7B illustrates multiplexing the gate of each replica transistor to either the top or the bottom of the differential mode DAC.

FIG. 7A illustrates the differential mode calibration of replica transistor $M_B$ 205 to compensate for differences between the replica transistors. The digital control logic configures the RF detector 107 by disconnecting the gate of $M_1$ 201 from the RF pin and shorting $R_{CM}$ 209. The digital control logic controls switches, not shown in FIG. 7A, to implement the desired hardware configuration for calibration. The bias current $2I_B$, which as shown is made of $I_{B\_A}+I_{B\_B}$ is halved by disabling $I_{B\_B}$. The other replica transistor $M_A$ 203 is disabled. Note that $R_{DM}$ is set to mid-scale so that it is equal to $R_1$. The digital DM calibration algorithm modifies $R_{DM}$ until $V_1=V_2$. The result of the differential calibration $R_{OSDM}$ is calculated as $R_{OSDM}=(R_{DM\_A}-R_{DM\_B})/2$, where $R_{DM\_A}$ is the resistance value of $R_{DM}$ during calibration with $M_A$ 203 enabled and $M_B$ 205 disabled and $R_{DM\_B}$ is the resistance value of $R_{DM}$ with $M_B$ 205 enabled and $M_A$ 203 disabled. In embodiments, the differential mode calibration of the replica transistors can be repeated as shown in FIG. 6 and/or FIG. 7A using $I_{B\_B}$ and with $I_{B\_A}$ disabled to calibrate differential mode with the other half of the bias current. Note that to implement a negative $V_{OSDM}$, where $V_{OSDM}=R_{OSDM}*(I_{B\_A}+I_{B\_B})$, the gate connections of $M_A$ 203 and $M_B$ 205 across $R_{DM}$ 207 are swapped. That is, the gate the first replica transistor $M_A$ 203 and the gate of the second replica transistor $M_B$ 205 either connect, respectively, to the top node of the $R_{DM}$ 207 and the bottom node of $R_{DM}$ 207 or vice versa. That is accomplished, as shown in FIG. 7B by multiplexing the gate of each replica transistor to either the top or the bottom of $R_{DM}$ 207 according to configuration settings CTL1 and CTL2 supplied to the multiplexers 751 and 753.

Figure 8:
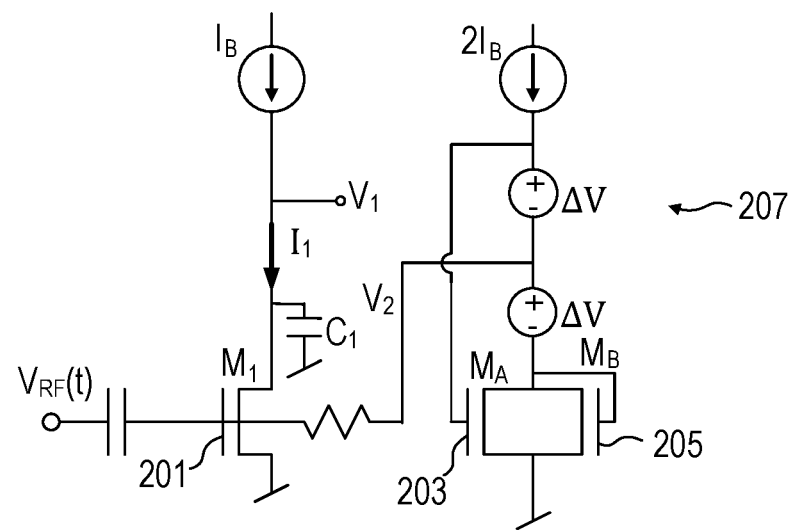
FIG. 8 illustrates the RF detector circuit for use in a mathematical description of circuit operation.

With reference to FIG. 8 illustrating the RF detector circuit, a mathematical explanation of operation of the RF detector circuit is provided. The V-I curve of a MOS transistor in weak inversion, and in saturation ($v_{DS}>>n\phi_t$) is $$i_D = \frac{W}{L}I'_M e^{\frac{v_{GS}-V_M}{n\phi_t}}\left(1 - e^{-\frac{v_{DS}}{\phi_t}}\right) \approx \frac{W}{L}I'_M e^{\frac{v_{GS}-V_M}{n\phi_t}} \quad (1)$$

where $I'_M$ and $V_M$ and $n{\sim}1$ are process dependent constants and $\phi_t=25.9$ mV at T=300K.

Assuming that $M_1=M_A=M_B$ then one can write $$i_{Dx} = I_M e^{\frac{v_{GSx}}{n\phi_t}}, \text{ where } I_M = \frac{W}{L}I'_M e^{\frac{V_M}{n\phi_t}} \text{ and } x = 1, A, B \quad (2)$$

Assuming $C_1$ is acting as an averaging filter for current $i_1(t)$ and that $V_{RF}(t)=A\sin(2\pi ft)$, where $f$ is the rf signal frequency, then $$\overline{I_1} = f\int_0^{\frac{1}{f}} i_1(t)dt = f\int_0^{\frac{1}{f}} I_M e^{\frac{A\sin(2\pi ft)+V_2}{n\phi_t}} dt = I_M e^{\frac{V_2}{n\phi_t}} f\int_0^{\frac{1}{f}} e^{\frac{A\sin(2\pi ft)+V_2}{n\phi_t}} dt \quad (3)$$

Eq. (3) can also be rewritten as $$\overline{I_1} = I_M e^{\frac{V_2}{n\phi_t}} \frac{1}{2\pi}\int_0^{2\pi} e^{\frac{A}{n\phi_t}\sin(x)} dx, \text{ where } x = 2\pi ft \quad (4)$$

The integral in Eq. (4) can be further simplified by using the modified Bessel function of the first kind $I_0()$:

$$\overline{I_1} = I_M e^{\frac{V_2}{n\phi_t}} \cdot I_0\left(\frac{A}{n\phi_t}\right) \quad (5)$$

The next step is to calculate $V_2$ from the right hand bias circuit. By applying Eq. (2) to the bias circuit on the right one can derive the following equation:

$$I_M e^{\frac{V_2+\Delta V}{n\phi_t}} + I_M e^{\frac{V_2+\Delta V}{n\phi_t}} = 2I_B \quad (6)$$

Solving Eq. (6) yields $$I_M e^{\frac{V_2}{n\phi_t}} = \frac{I_B}{\cosh\left(\frac{\Delta V}{n\phi_t}\right)} \quad (7)$$

replacing Eq. (7) into Eq. (4), and solving gives $$\frac{\overline{I_1}}{I_B} = \frac{I_0\left(\frac{A}{n\phi_t}\right)}{\cosh\left(\frac{\Delta V}{n\phi_t}\right)} \quad (8)$$

Finally notice that the point of detection happens exactly when $I_1$ is equal to $I_B$ because otherwise $V_1$ will either rail high or low. That means setting the left hand term in Eq. (8) to 1. The final condition for the detection is then:

$$\cosh\left(\frac{\Delta V}{n\phi_t}\right) = I_0 I_0\left(\frac{A}{n\phi_t}\right). \quad (9)$$

Eq. (9) is a nice closed form that relates $\Delta V$ and A normalized by $n\phi_t(=V_{TH})$, but it can unfortunately only be solved numerically. One way to get a better insight into the result is to use the Taylor expansion:

$$I_0(A') = \sum_{k=0}^{\infty} \frac{(A'/2)^{2k}}{k!^2} = 1 + \left(\frac{A'}{2}\right)^2 + \frac{1}{4}\left(\frac{A'}{2}\right)^4 + \frac{1}{36}\left(\frac{A'}{2}\right)^6 + O(8)$$

$$\cosh(\Delta V') = \sum_{k=0}^{\infty} \frac{(\Delta V')^{2k}}{(2k)!} = 1 + \left(\frac{\Delta V'}{\sqrt{2}}\right)^2 + \frac{1}{6}\left(\frac{\Delta V'}{\sqrt{2}}\right)^4 + \frac{1}{90}\left(\frac{\Delta V'}{\sqrt{2}}\right)^6 + O(8)$$

It can be shown that $\Delta V = A/\sqrt{2}$, (for small values of $\Delta V'$), which means that the voltage applied through the programmable DM DAC $R_{DM}$ 207 (with each resistor 208 and 210 shown as $\Delta V$ in FIG. 8) determines the RMS value of the input sinusoidal signal threshold. Note that as long as matching is guaranteed between the replica transistors 203, 205 and the main sense transistor 201, the sensing threshold is process and temperature independent.

Figure 9:
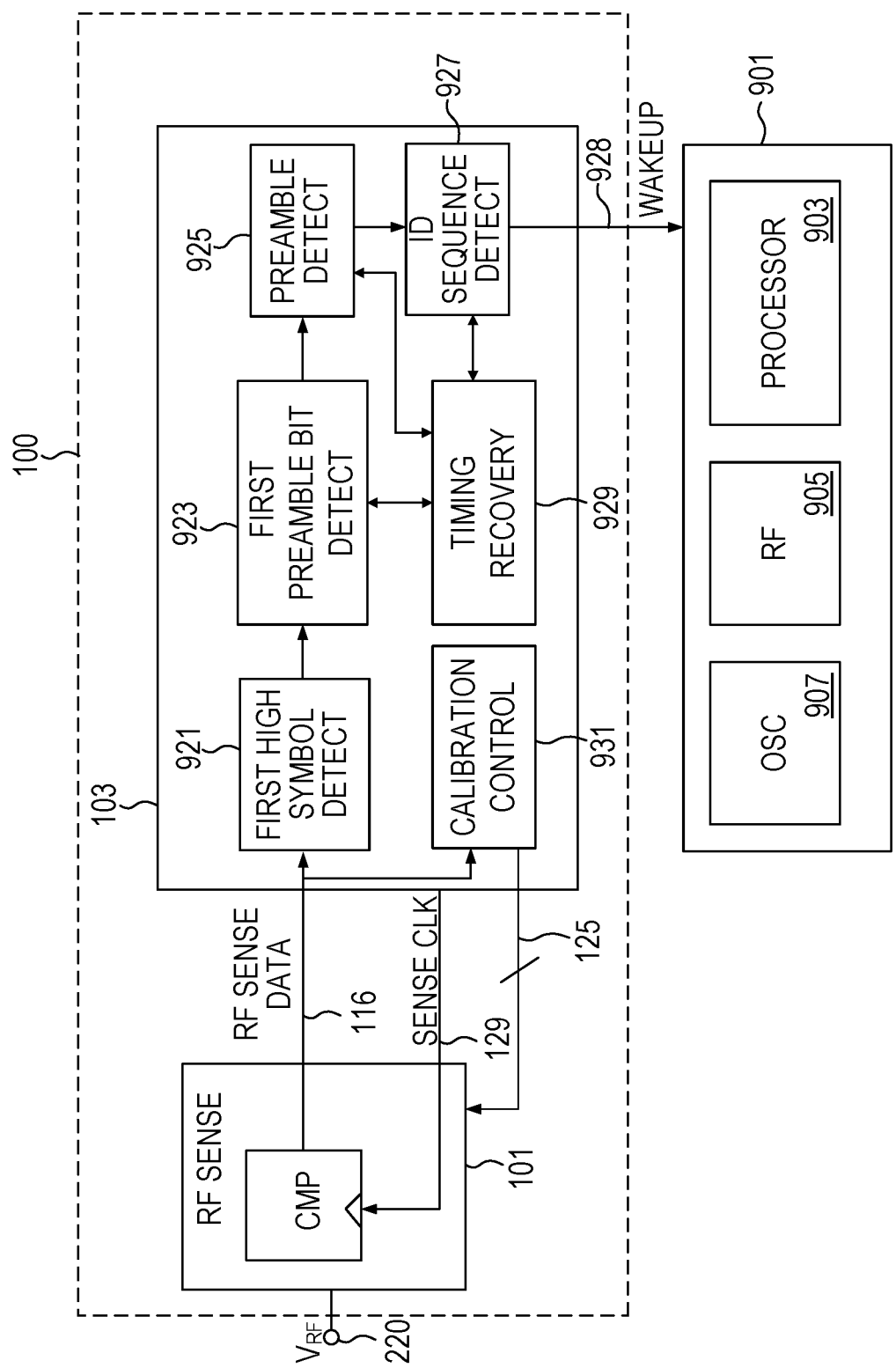
FIG. 9 illustrates a block diagram of an embodiment of the digital control logic of the wake on radio system.

Referring to FIG. 9, a high level block diagram of the digital control logic 103 is illustrated. The digital control logic 103 of the wake on radio system 100 receives the sensed data 116 from the RF sense circuit 101. In an embodiment, rather than using a continuous wave RF signal that does not uniquely address the target wake on radio circuit, the wake on radio circuit 100 utilizes on/off keying (OOK) to implement a selective addressing scheme. OOK allows a selective mode to be utilized that uses, e.g., a preamble and a unique identification (ID) sequence. In embodiments, the preamble is common to multiple wake on radio circuits but the identification sequence is unique to the specific wake on radio circuit. The digital control logic 103 detects the OOK modulated signal, recovers the clock based on the received data, detects the preamble, and detects if the unique OOK ID sequence has been transmitted. While the wake on radio system 100 is operating, the larger system 901 remains in a reduced power state. The larger system 901 includes, by way of example, a processor 903, an oscillator 907, and additional RF circuits 905 to perform RF transmit and receive functions. In various embodiments the larger system 901 includes memory and other types of digital and analog circuits needed for the particular application.

In an embodiment the wake on radio system utilizes Manchester encoding. In a Manchester encoded system, two different symbols are used for each data bit, requiring a transition for each data bit. For example, a logical 1 is represented by a 1 symbol followed by a 0 symbol and a logical 0 is represented by a 0 followed by a 1. In order to save power, the digital control section turns on decoding logic only as needed. That means the digital control logic uses a staged approach that incrementally turns on decoding logic based on the completion of the prior decoding step. For example, while the digital control logic 103 can be largely in the off state, detection logic 921 remains on to detect the first high symbol. The first high symbol detection logic 921 waits for a one to be provided from the RF sense circuit 101 indicating that an RF input signal has been detected. That logic requires only a small amount of power and includes, e.g., two flip-flops. Responsive to detection of the first high symbol, the digital control logic enables detection of the first preamble bit detection logic 923, which includes, e.g., 4 flip-flops. Thus, once the first preamble bit detection logic 923 is enabled, the digital control logic 103 consumes an additional increment of power. In an embodiment, the first bit of the preamble is a 1, and thus once the first high symbol has been detected, the first bit preamble bit detect logic 923 looks for a transition to 0. Thus, the next evaluated sample from the RF sense circuit 101 should be zero.

Once the first preamble bit is detected by first preamble bit detect logic 923, the digital control logic 103 enables the preamble detect logic block 925. The preamble detect logic block, includes, e.g., 20 flip-flops. In an embodiment, the preamble is 8 bits. Other embodiments use preambles with different lengths. The preamble detect logic decodes the Manchester encoded preamble and compares the received preamble to a stored preamble value in digital control logic 103. The expected preamble value may be stored in non-volatile memory (NVM) or other memory accessible to digital control logic 103. Once the preamble is detected, the digital control logic 103 enables the ID sequence detect logic 927. If the correct ID sequence is detected, the digital control logic 103 asserts the wakeup signal 928 supplied to the larger system 901 to cause the larger system 901 to wake up. The ID sequence detect logic 927 decodes the Manchester encoded ID sequence and compares the received ID sequence to a stored value. The expected ID sequence value may be stored in nonvolatile memory (NVM) or other memory accessible to digital control logic 103. Embodiments use an ID sequence with, e.g., 32 bits but the sequence length is determined by application requirements and thus other lengths are used in other embodiments. In some embodiments, the lengths of the preamble and/or the ID sequence is programmable.

The digital control logic 103 saves power by incrementally turning on decoding logic as decoding milestones (e.g., first high symbol, first preamble bit, preamble, ID sequence) are met. In addition, the digital control logic provides an abort mechanism so that if the decoding detects a mismatch between the received bit value and the expected bit value in the preamble or ID sequence the digital control logic 103 stops decoding and returns to awaiting the first high symbol using first high symbol detect logic 921. The check for miscompares can be made on a bit or byte value. The remaining decode blocks return to their off state to save power. In that way, the wake on radio system does not waste power once a mismatch has been detected. The mismatch may be due to an error condition caused by, e.g., RF noise from a nearby RF source or other error condition in the transmitter or receiver. Alternatively, the mismatch may occur because the preamble or ID sequence does not match the preamble or ID sequence used by the particular wake on radio system. Thus, e.g., when another wake on radio circuit is the intended target, the ID sequence received will not match the expected ID sequence.

In embodiments, the unique ID sequence for each device is at least two bits different. That allows a single bit error (or more) to be tolerated if desired. Thus, in an error tolerant environment, if each ID sequence is at least two bits different, a single bit transmission or reception mismatch for a 32 bit sequence would not result in a decode abort. In those embodiments, at least a two bit mismatch would be required for an abort. That allows for even greater design tolerances. In other embodiments, a single bit mismatch in the preamble or ID sequence results in a decode abort. Thus, the error threshold for the number of errors tolerated can vary from 0 to one or more according to system requirements and can be programmable.

In an embodiment, the RF sense circuit 101 receives a 4 kHz clock and nominally samples each symbol four times, thus utilizing a 1 kHz symbol rate and 0.5 kHz data rate assuming Manchester encoding is used. In an embodiment, the digital control logic 103 uses a power efficient timing recovery approach to select the best of the four samples to use for each symbol. The timing recovery logic 929 nominally expects four samples. Because the RC clock may be off by approximately ±20%, the nominal 8 samples per data bit (four samples per symbol) may average 7.2 samples per bit with a slow clock (3.2 kHz) or 9.6 samples per bit with a fast clock (4.8 kHz). The timing recovery logic 929 looks at recent data showing the number of samples for each bit. Remember each bit has a transition due to Manchester encoding. Thus, based on recent averages, the data recovery can identify how many samples each bit (and symbol) is getting and which of the three, four, or five samples makes the most reliable sample point for the symbol and patterns indicating how many samples are likely in the next symbol and bit. The most reliable sample point will be at least one sample away from a transition. Thus, e.g., with three samples for a symbol, the best sample is the middle sample. With four samples for a symbol, the best sample is sample 2 or 3. For those symbols getting five samples, the best sample is in the third sample. That approach helps the digital control logic tolerate a relatively inaccurate low power RC clock.

In another power saving mechanism, timeouts are used in the various decoding stages so that if a transmission stops in the middle, and the decoding logic fails to detect a next bit due to no transitions detected for a valid Manchester encoded data bit, after a predetermined time period the digital control logic 103 stops the decoding process and returns to await the first high bit. For example, a time out may be used for decoding the first data bit of the preamble, decoding the preamble, and decoding each byte of the ID sequence.

In addition to the decoding required to determine wakeup events, the digital control logic runs the background calibrations for the analog portion and stores various calibration values for the PTAT bias current generators and the programmable resistors of the DM DAC and the CM DAC. In an embodiment, the digital control logic 103 includes finite state machines in calibration control logic 931 to implement the calibration described for the various configuration settings in FIGS. 3-7 including configuring the switches for the desired hardware configuration, applying and/or adjusting appropriate resistance or current values, controlling the bias current generators as needed, and turning on the bandgap voltage generator when needed. The calibration control logic 931 receives the output of the comparisons made during calibration through the same compare path (RF sense data 116) used operationally. In addition, the calibration control logic 931 supplies the appropriate configuration and control settings 125 to control various aspects of the calibration operations. The calibration control logic 931 includes a counter (not shown in FIG. 9) that determines the interval between calibration operations. In embodiments, that interval is programmable. The calibration operations can be run while the larger system 901 remains in a low power or off state.

Figure 10A:
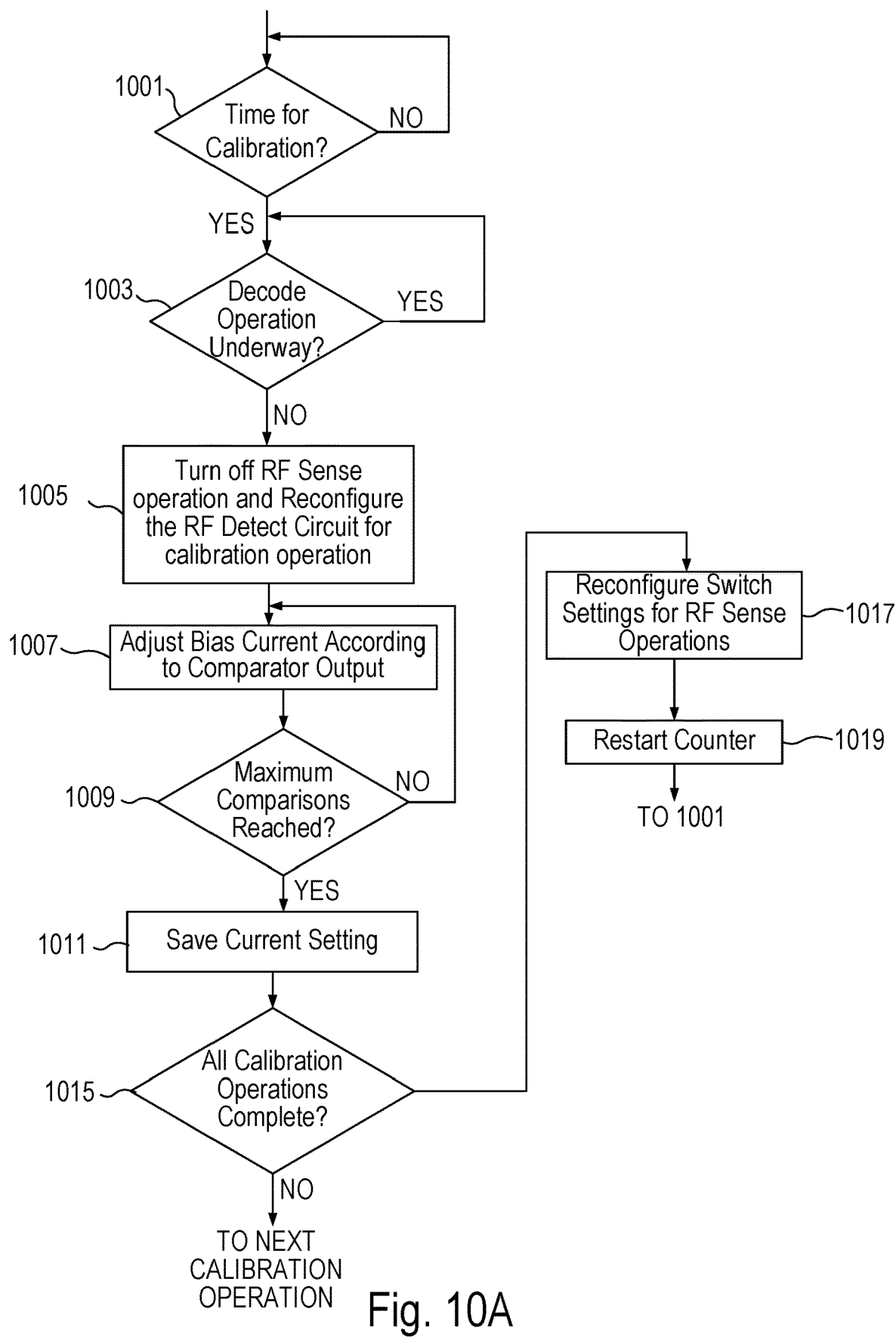
FIG. 10A shows a flow chart of the control sequence for one of the calibration operations (PTAT bias current calibration).
Figure 10B:
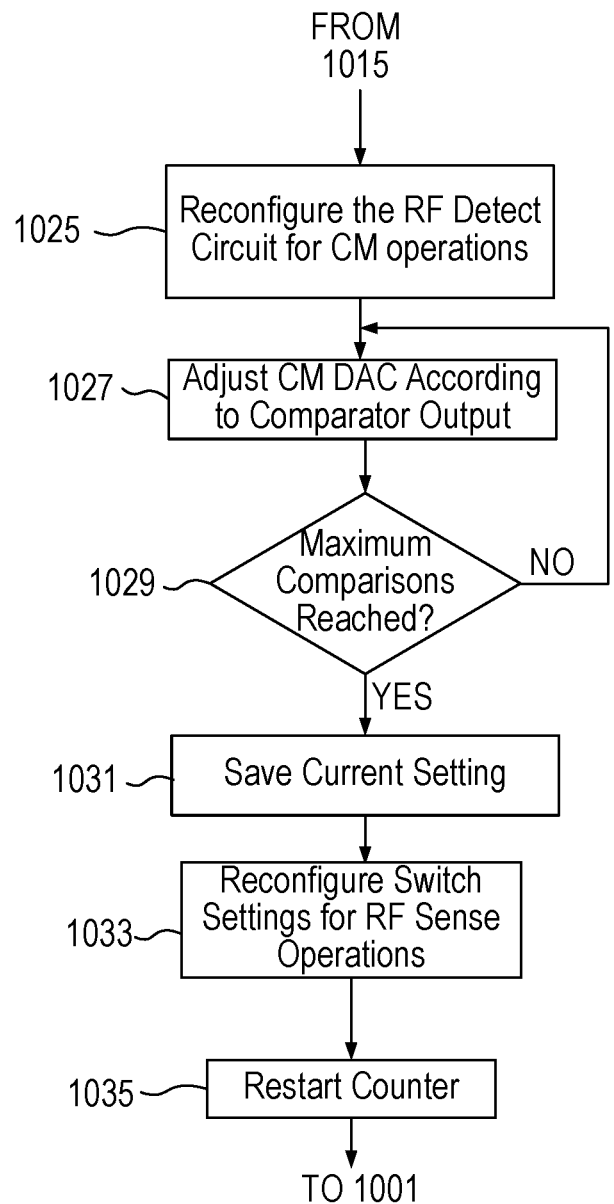
FIG. 10B shows a flow chart of the control sequence for one of the common mode calibration operations.

FIG. 10A shows a flow chart of the control sequence for one of the calibration operations (PTAT bias current calibration). In 1001, the configuration control logic waits for the counter to indicate that it is time to perform a calibration operation. Next the control logic checks to see if a decode operation is underway in 1003. If a decode operation is underway, the calibration control logic waits for the decode operation to complete before starting the calibration operation. The calibration control logic turns off the RF sense operation and reconfigures the RF detect circuit as shown in FIG. 3 by supplying appropriate switch values in 1005 to cause the DAC resistors to be in series, the comparator to receive the voltage at node 301 and the bandgap voltage to be supplied to the other comparator input and the RF input to be decoupled. Then the control logic adjusts the bias current in 1007 up or down based on the comparator output. The control logic checks in 1009 if the PTAT calibration operation has reached a fixed number of comparisons (e.g., four comparisons) or a fixed amount of time spent in calibration is otherwise determined. That guarantees that the RF Sense circuit 101 isolation time from the RF input signal is bounded and ensures that the duty-cycled power ratio of the high-power bandgap reference 106, needed during the PTAT calibration, is always the same. If the comparator toggles before the fixed number of comparisons, the control logic keeps toggling the PTAT current setting up and/or down using a minimum change up and/or down until the maximum number of comparisons is reached. In other embodiments, the calibration operation stops if the comparator toggles before the fixed number of comparisons or other boundary condition has been reached. Once the calibration stops, the calibration control logic saves the last current setting in 1011. The calibration control logic then determines in 1015 if all calibration operations are complete. For example, after the bias current calibration, the calibration logic performs a calibration of the CM DAC 209 as described in FIGS. 4 and 5. If calibration is complete, the calibration control logic then reconfigures the switch settings to an operational state in 1017 and the rf sense circuit resumes normal operation. Finally, at the end of the calibration operation, the calibration control logic resets the counter in 1019 to again count the time period for the next calibration. Rather than reconfigure the switch settings in 1017 for RF sense operations, and restart the counter in 1019, the calibration control logic may proceed to another calibration as shown in FIG. 10B. The control flow for the remainder of the calibration operations are similar to that of FIG. 10A except that the configuration settings are different and in the other configuration operations, the calibration control logic adjusts the programmable resistors rather than the bias current source.

FIG. 10B illustrates the calibration control operations for performing CM DAC calibration after the bias current calibration of FIG. 10A. The calibration control logic reconfigures the RF detect circuit from bias current calibration to CM calibration in 1025, e.g., as shown in FIG. 5. Once the RF detect circuit is reconfigured through switch settings, the calibration control logic adjusts the programmable resistor 209 (see FIG. 5) in 1027 according to the comparator output and checks in 1029 if the calibration operation has reached a fixed number of comparison (e.g., four comparisons) or a maximum amount of time allowed in calibration is otherwise determined. That guarantees that the RFSENSE 101 isolation time from the RF input signal is bounded. If the comparator toggles before the fixed number of comparisons has been reached, the control logic keeps toggling the resistance of the CM DAC up and/or down using a minimum change up and/or down until the maximum number of comparisons is reached. In other embodiments, the calibration operation stops if the comparator toggles before the fixed number of comparisons or other boundary condition has been reached. The calibration control logic stores the last resistor settings in 1031, reconfigures the switch settings for RF sense operations in 1033, restarts the counter in 1035 to begin counting the predetermined interval between calibration operations, and then returns to 1001 (FIG. 10A) to wait the proper interval for the next calibration.

Figure 11:
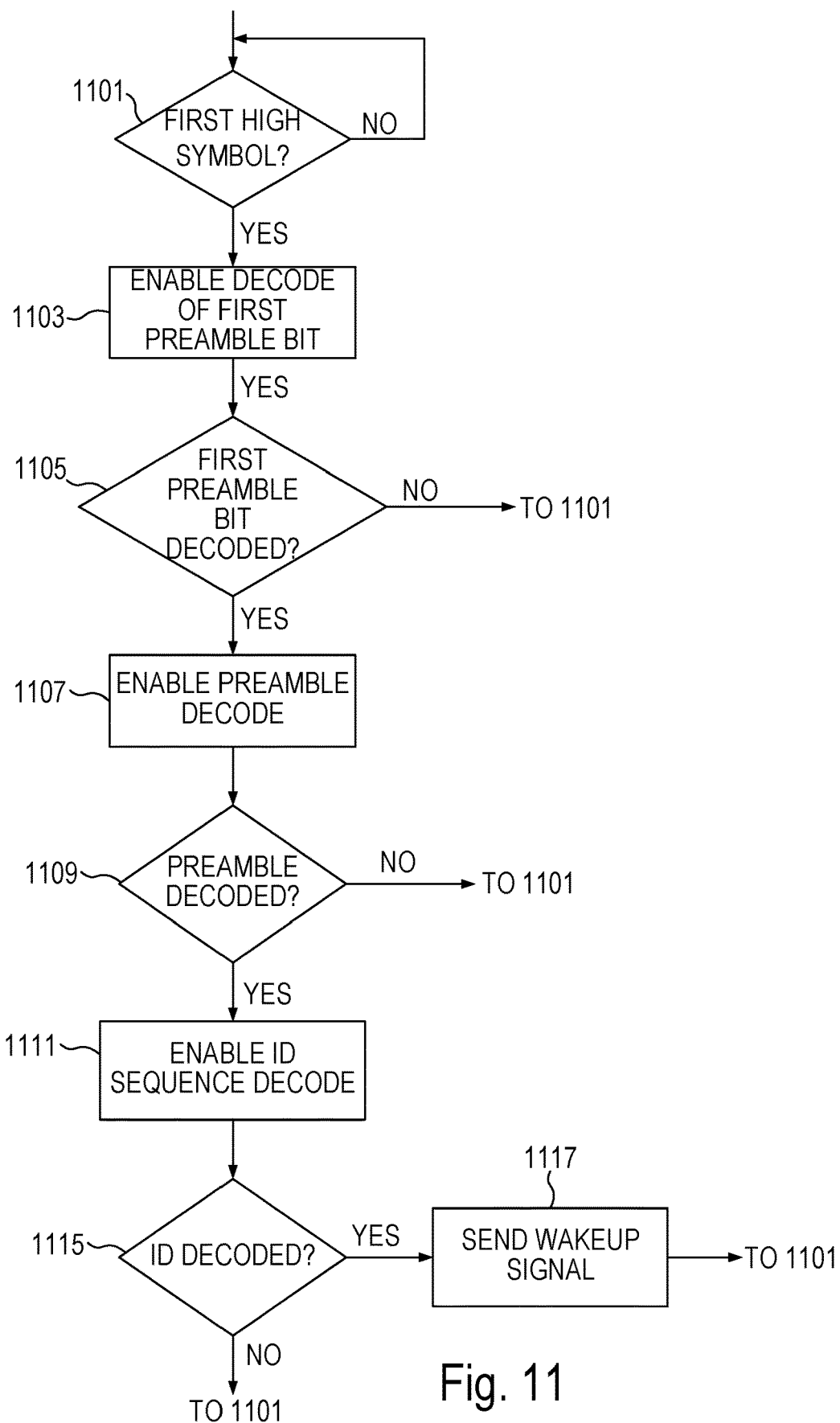
FIG. 11 is a flow chart illustrating an embodiment of the incremental decoding process utilized by the digital control logic.

FIG. 11 shows a flow chart illustrating the decoding process utilized by the digital control logic. In 1101, the digital control logic awaits the first high symbol using block 921. Responsive to getting the first high symbol, the digital control logic enables detection of the first preamble bit in 1103. If decoding the first preamble bit is unsuccessful due to a time out or other error conditions, the digital control logic returns to 1101 to await the first high symbol. In 1105, upon successful detection of the first preamble bit, the digital control logic enables the preamble detect logic 925 (see FIG. 9) in 1107. The digital control logic checks if the preamble is successfully decoded in 1109, and if so, the digital control logic enables decoding the ID sequence in 1111. If in 1109 the digital control logic determines that the preamble is not successfully decoded due to, e.g., a miscompare or time out, the digital control logic returns to 1101 to look for the first high symbol. With the ID sequence decode enabled, the digital control logic checks in 1115 to see if the ID sequence was successfully decoded. If so, the digital control logic asserts the wakeup signal in 1117 and returns to 1101 to await the first high symbol. If in 1115 the digital control logic determines that the ID sequence is not successfully decoded due to, e.g., a miscompare or time out, the digital control logic returns to 1101 to look for the first high symbol. Whenever the digital control logic returns to 1101, the other decoding logic is turned off to save power.

Figure 12:
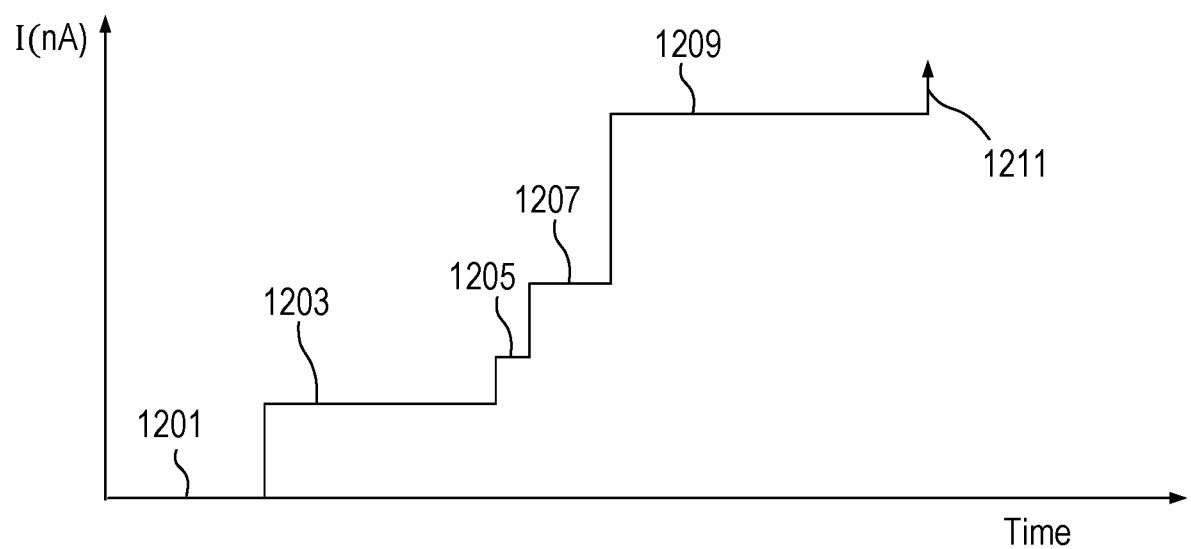
FIG. 12 illustrates the current usage in an embodiment that utilizes the incremental turn on of decoding logic.

FIG. 12 illustrates a current profile according to an embodiment of the invention using the staged decoding process described herein. With power off completely, the wake on radio circuit utilizes zero nA at 1201. While waiting for the first high symbol, the analog RF sense circuit listens for an input radio signal, and the wake on radio circuit 100 utilizes, e.g., 200 nA as shown in 1203. The digital control logic has on minimum logic including the first symbol detect logic 921 (FIG. 9). In addition, the digital control logic has a counter operating in calibration control logic 931 (see FIG. 9) that tracks the time between calibrations. Once the first high symbol is detected, the first bit decode logic is enabled, and the current use increases at 1205. With the preamble detect enabled, the current increases again to 1207. With the ID sequence detect enabled the current increases to 1209. Finally, after successful ID sequence detect, the larger system 901 (FIG. 9) wakes up and the current consumption increases, e.g., by an order of magnitude at 1211, e.g., from nA to μA. The staged upbringing, along with aborts on mismatches and timeouts ensures that power savings are utilized where possible. Note that the OOK approach with a preamble and unique ID sequence allows the staged design that saves power. In addition, the OOK approach with a preamble and unique ID ensures that the design has higher immunity to interference than previous wake on radio approaches that did not provide selectivity in communication with the wake on radio circuit and helps prevent false triggers that would otherwise consume more power.

The low power wake on radio system embodiments described herein can be used in various embodiments. For example, the low power wake on radio system may be used in battery powered devices to prolong battery life. In addition, the wake on radio system described herein can be used in consumer electronic devices that have batteries inserted and charged due to consumer expectations of being able to use a device immediately rather than having to charge a device before use. The low power wake on radio system allows devices to stay in a very low power mode in inventory with only the wake on radio circuit listening for a preamble and unique ID. The power consumption while listening is very low allowing the device to maintain its charge in inventory. The device can then be woken using the wake on radio system embodiments described herein before shipping to a consumer (or purchased at a retail store by the consumer) and enter a slightly higher power state that allows the consumer to immediately interact with the device on receipt.

Thus, a wake on radio circuit has been described. The description of the invention set forth herein is illustrative and is not intended to limit the scope of the invention as set forth in the following claims. Variations and modifications of the embodiments disclosed herein, may be made based on the description set forth herein, without departing from the scope of the invention as set forth in the following claims.

What is claimed is:

1. A method comprising:
supplying a plurality of detection indications sequentially over a signal line from an analog portion of a wake on radio circuit to a digital portion of the wake on radio circuit, each of the detection indications having a first value to indicate that a radio frequency (RF) signal was detected on an input to the wake on radio circuit and having a second value to indicate that no RF signal was detected on the input;
detecting that a first high symbol was received while first preamble bit detection logic is turned off;
responsive to detecting that the first high symbol was received based on one of the detection indications, turning on the first preamble bit detection logic;
detecting a first preamble bit of a preamble in the first preamble bit detection logic while preamble detect logic is turned off, the first preamble bit including the first high symbol; and
responsive to detecting the first preamble bit, turning on the preamble detect logic to detect the preamble, the preamble including the first preamble bit.

2. The method as recited in claim 1 further comprising:
responsive to detecting the preamble, turning on identification sequence detect logic to detect an identification sequence; and
responsive to detecting the identification sequence, generating a wakeup signal.

3. The method as recited in claim 2 further comprising:
using the identification sequence detect logic to detect an identification sequence unique to the wake on radio circuit; and
tolerating a threshold number of errors in detecting the identification sequence, the threshold number of errors being at least one.

4. The method as recited in claim 1 further comprising:
responsive to detecting the first preamble bit, turning on preamble detect logic, the preamble including the first preamble bit;
responsive to failing to detect the preamble by detecting one or more errors in the preamble after detecting the first preamble bit, aborting detecting the preamble;
as part of the aborting detecting the preamble, disabling the preamble detect logic; and
returning to detect another first high symbol associated with another preamble.

5. The method as recited in claim 1 further comprising:
responsive to detecting the first preamble bit, turning on preamble detect logic to detect the preamble, the preamble including the first preamble bit;
responsive to detecting the preamble, turning on identification sequence detect logic to detect an identification sequence;
responsive to failing to detect the identification sequence by detecting a threshold number of errors in the identification sequence, aborting detecting the identification sequence;
as part of the aborting detecting the identification sequence, turning off the identification sequence detect logic; and
returning to detect another first high symbol associated with another preamble.

6. The method as recited in claim 5 further comprising:
periodically performing a calibration operation of the wake on radio circuit responsive to passage of a predetermined time period, the calibration operation including,
turning on a bandgap reference circuit to supply a reference voltage to calibrate a bias current used to create voltage that determines a detection threshold for the RF signal; and
turning off the bandgap reference circuit responsive to an end of the calibration operation.

7. The method as recited in claim 5 wherein detecting the RF signal further comprises:
receiving a signal at the input to the wake on radio circuit at a gate of a first transistor operating in an open-drain configuration having the gate biased so that a drain of the first transistor toggles from high to low responsive to an amplitude of the RF signal reaching a threshold level.

8. The method as recited in claim 7 further comprising:
supplying a bias current to first and second programmable resistors coupled in series;
supplying a voltage from a middle node between the first and second programmable resistors as a reference voltage to a comparator;
biasing the gate of the first transistor based, at least in part, on the voltage from the middle node; and
comparing the voltage from the middle node to a drain voltage on the drain of the first transistor to determine presence of the RF signal on the input to the wake on radio circuit.

9. The method as recited in claim 1 wherein the first preamble bit is Manchester encoded and is formed of a one symbol corresponding to the first high symbol followed by a zero symbol.

10. An apparatus comprising:
an analog portion of a wake on radio circuit configured to supply a plurality of detection indications sequentially from a comparator, each of the detection indications having a first value to indicate that a radio frequency (RF) signal was detected on an input of the wake on radio circuit and having a second value to indicate that no RF signal was detected on the input;
a digital portion of the wake on radio circuit coupled to the comparator, wherein the digital portion is configured to incrementally turn on decode logic to decode whether a radio transmission intended for the wake on radio circuit has been received based on a plurality of the detection indications supplied by the comparator;
wherein the digital portion includes,
first high symbol detect logic coupled to the comparator to determine whether a first high symbol was received based on one of the detection indications;
first preamble bit detect logic that is off while the first high symbol is being detected, wherein the digital portion is responsive to detecting the first high symbol to turn on the first preamble bit detect logic to detect a first bit of a preamble that includes the first high symbol; and preamble detect logic to detect the preamble, the preamble detect logic being off while the first bit of the preamble is being detected by the first preamble bit detect logic, and the preamble detect logic is turned on to detect the preamble responsive to detection of the first bit of the preamble.

11. The apparatus as recited in claim 10 wherein the digital portion of the wake on radio circuit is configured to periodically cause the analog portion to enter a calibration mode that uses the comparator for calibration.

12. The apparatus as recited in claim 10 wherein the digital portion further comprises:

identification sequence detection logic to detect an identification sequence, the identification sequence detection logic being off while the preamble is being detected and the identification sequence detection logic being turned on responsive to detection of the preamble; and wherein the digital portion is responsive to detecting the identification sequence to generate a wakeup signal.

13. The apparatus as recited in claim 10; wherein the digital portion is responsive to failing to detect the preamble by detecting one or more differences in the preamble from an expected preamble after detecting the first bit of the preamble, to abort detecting the preamble, turn off the preamble detect logic, and await detection of another first high symbol associated with another preamble.

14. The apparatus as recited in claim 10 further comprising:

identification sequence detection logic to detect an identification sequence, the identification sequence detection logic being turned on responsive to detection of the preamble; and wherein the digital portion is further configured, responsive to detecting a threshold number of errors in the identification sequence, to abort detection of the identification sequence, to turn off the identification sequence detection logic, and await detection of another first high symbol associated with another preamble.

15. The apparatus as recited in claim 10 wherein the analog portion further comprises:

an input transistor having a gate coupled to the input to the wake on radio circuit to detect when a radio frequency (RF) signal is present on the input; and wherein the comparator has a first comparator input coupled to a drain of the input transistor in an operational mode and has a second comparator input coupled to a reference voltage in the operational mode.

16. The apparatus as recited in claim 10 wherein the first bit of the preamble is Manchester encoded and is formed of a one symbol corresponding to the first high symbol followed by a zero symbol.

17. An apparatus comprising:

an analog portion of a wake on radio circuit to detect a radio frequency (RF) signal present on an input to the wake on radio circuit and to indicate on a signal line presence of the RF signal and absence of the RF signal;

a digital portion of the wake on radio circuit coupled to the signal line, the digital portion including, first high symbol detect logic coupled to the signal line to detect a first high symbol;

first preamble bit detect logic, wherein the first preamble bit detect logic is off while the first high symbol is being detected and responsive to detection of the first high symbol, the first preamble bit detect logic is enabled and used to detect a first bit of a preamble that includes the first high symbol;

preamble detect logic to detect the preamble, wherein the preamble detect logic is off while the first bit of the preamble is being detected and the preamble detect logic is enabled responsive to detection of the first bit of the preamble;

identification sequence detection logic to detect an identification sequence unique to the wake on radio circuit, the identification sequence detection logic being enabled responsive to detection of the preamble; and wherein responsive to detecting the identification sequence, the digital portion generates a wakeup signal to wake up circuitry kept in a low power state until the identification sequence unique to the wake on radio circuit, is detected.

18. The apparatus as recited in claim 17, wherein the digital portion is responsive to failing to detect the preamble after detecting the first preamble bit, to abort detecting the preamble; and wherein as part of the abort, the digital portion disables the preamble detect logic and awaits detection of another first high symbol associated with another preamble.

19. The apparatus as recited in claim 17, wherein the digital portion is responsive to failing to detect the identification sequence, to abort detecting the identification sequence; and wherein as part of the aborting detecting the identification sequence, the digital portion disables the identification sequence detection logic used to detect the identification sequence and returns to detect another first high symbol associated with another preamble.

20. The apparatus as recited in claim 17, wherein the digital portion is configured to tolerate a threshold number of errors in detecting the identification sequence, the threshold number of errors being at least one.

* * * * *